(12) United States Patent
Zuch

(10) Patent No.: US 6,250,705 B1
(45) Date of Patent: Jun. 26, 2001

(54) MOTOR VEHICLE SEAT WITH A SEAT HEIGHT ADJUSTMENT

(75) Inventor: Harald Zuch, Wedemark (DE)

(73) Assignee: Faurecia Autositz GmbH & Co. KG, Stadthagen (DE)

( * ) Notice: Subject to any disclaimer, the term of this patent is extended or adjusted under 35 U.S.C. 154(b) by 0 days.

(21) Appl. No.: 09/379,119

(22) Filed: Aug. 23, 1999

(30) Foreign Application Priority Data

Sep. 9, 1998 (DE) .............................................. 198 41 197

(51) Int. Cl.$^7$ ....................................................... B60N 2/16
(52) U.S. Cl. .................. 296/68.1; 296/65.05; 297/216.1; 297/216.16; 248/422
(58) Field of Search .............................. 296/65.05, 65.01, 296/65.08, 65.09, 68.1; 297/216.1, 216.16, 216.2; 248/422

(56) References Cited

U.S. PATENT DOCUMENTS

| 3,866,270 | * | 2/1975 | Suzuki et al. ................. 297/216.1 X |
| 3,897,101 | * | 7/1975 | Hess ..................................... 296/68.1 |
| 4,828,213 | * | 5/1989 | Saito et al. ...................... 248/422 X |
| 4,834,333 | * | 5/1989 | Saito et al. ...................... 248/422 X |
| 5,733,008 | * | 3/1998 | Tame ................................. 297/216.1 |
| 5,826,936 | * | 10/1998 | Scordato et al. .................. 297/216.1 |
| 5,882,061 | | 3/1999 | Guillouet . |
| 5,882,080 | * | 3/1999 | Houghtaling et al. ........ 297/216.1 X |
| 5,884,972 | | 3/1999 | Deptolla . |

FOREIGN PATENT DOCUMENTS

| 2060951 | * | 6/1972 | (DE) ................................ 297/216.16 |
| 27 23 550 | | 12/1978 | (DE) . |
| 2152104 B2 | * | 1/1981 | (DE) .................................... 296/68.1 |
| 296 23 024 U | | 11/1997 | (DE) . |
| 196 22 157 | | 12/1997 | (DE) . |
| 196 52 665 | | 5/1998 | (DE) . |
| 697 00 026 | | 9/1998 | (DE) . |

* cited by examiner

*Primary Examiner*—Dennis H. Pedder
*Assistant Examiner*—Patricia Engle
(74) *Attorney, Agent, or Firm*—Connolly Bove Lodge & Hutz

(57) ABSTRACT

A motor vehicle seat with a seat frame and a seat height adjustment device has two guide bars attached to the motor vehicle chassis. The guide bars are pivotable by a propulsion device about a horizontal axis to adjust the height of the seat in various positions of inclination. The guide bars are connected so as to resist torsion, and on the side of the seat opposite the propulsion device, a locking device which is sensitive to inertia is provided between the seat frame and the adjacent guide bar.

6 Claims, 3 Drawing Sheets

MOTOR VEHICLE SEAT WITH A SEAT HEIGHT ADJUSTMENT

BACKGROUND OF THE INVENTION

The invention relates to a motor vehicle seat with a seat-height adjustment device having two guide bars.

In the case of known motor vehicle seats of this type, a complete seat height adjustment unit is provided on either side of the seat frame consisting of a position adjustment device that may be rotated, and propulsion gearing that works with the latter for the repositioning of both guide bars by pivoting. The repositioning devices of the left and right sides of the seat must be connected to one another by means of a coupling element in such a way as to resist torsion. The use of two complete position adjustment devices for each motor vehicle seat involves a good deal of effort and expense. The coupling element is customarily a rigid connecting rod that interferes with the configuration and the solid attachment of the upholstery.

SUMMARY OF THE INVENTION

In order to prevent the necessity of two complete braces on either side of a seat, it is already known to provide arm inclination adjusters on only one side of a seat, and on the opposite side, a blocking device that is sensitive to inertia (DE 40 31 285 A1).

In addition, for inclination adjustment devices of this type, the provision of a locking device on one side of a seat that is activated by the safety belt is known (DE 37 05 571 A1).

It is an objective of the invention to embody a motor vehicle seat wherein it is possible to dispense with the provision of two complete repositioning devices as well as a connecting element between the latter that is capable of rotation, while assuring, nevertheless, that in the event of a crash, the seat is effectively locked on either side.

DETAILED DESCRIPTION OF THE PREFERRED EMBODIMENTS

Figure 1:
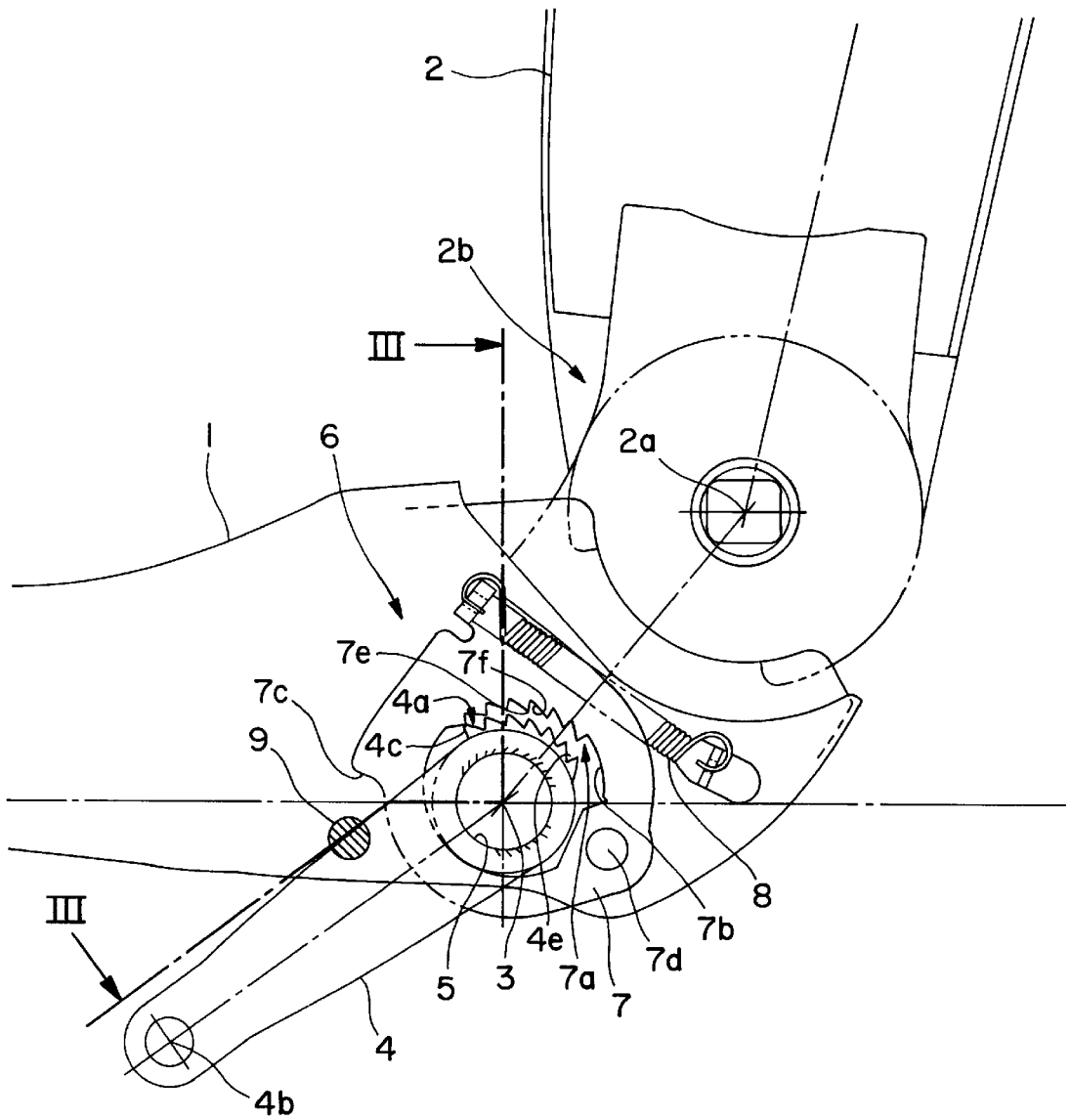
FIG. 1 shows a schematic lateral view of a locking device in the unlocked state, with the view oriented in the direction of the arrow I in FIG. 3.

Referring now to FIG. 1, a motor vehicle seat has a seat frame 1 and a back frame 2. The back frame 2 is arranged so as to be capable of pivoting around a horizontal axis 2a relative to seat frame 1 by way of an inclination adjustment device 2b which is not depicted in greater detail. The seat frame is connected to the chassis of the motor vehicle, which is not depicted, in such a way that its height may be adjusted, by means of front and back parallel guide bars. Of the guide bars, only the left, rear guide bar 4 is depicted, which may pivot around axle 4b which is firmly affixed to the chassis. The left, rear guide bar 4 is connected to the right, rear guide bar by way of a connecting tube 5 in such a way as to be incapable of torsion. A seat height adjustment device, not depicted, engages at the right rear guide bar in a known manner, which alters the inclination of the guide bar.

The pivoting motion of the left guide bar 4 relative to the seat frame 1 can be blocked by a locking device 6. On the seat frame 1 a locking element 7 is seated so that it can pivot around an axle 7d. A spring 8 which is attached to the seat frame 1 exerts pressure against locking element 7, and normally holds locking element 7 in the unlocked position. The locking element 7 is equipped with a recess 7b which surrounds the connection tube 5.

Locking element 7 has dentiform projections 7a within recess 7b. The projections 7a constitute sawtooth-like, internal gear teeth which are positioned opposite dentiform projections 4a fixed to guide bar 4. On its outer circumference, locking element 7 has a tappet 7c which comes to rest against a contact bolt 9 when the locking element 7 pivots around its axle 7d.

Figure 2:
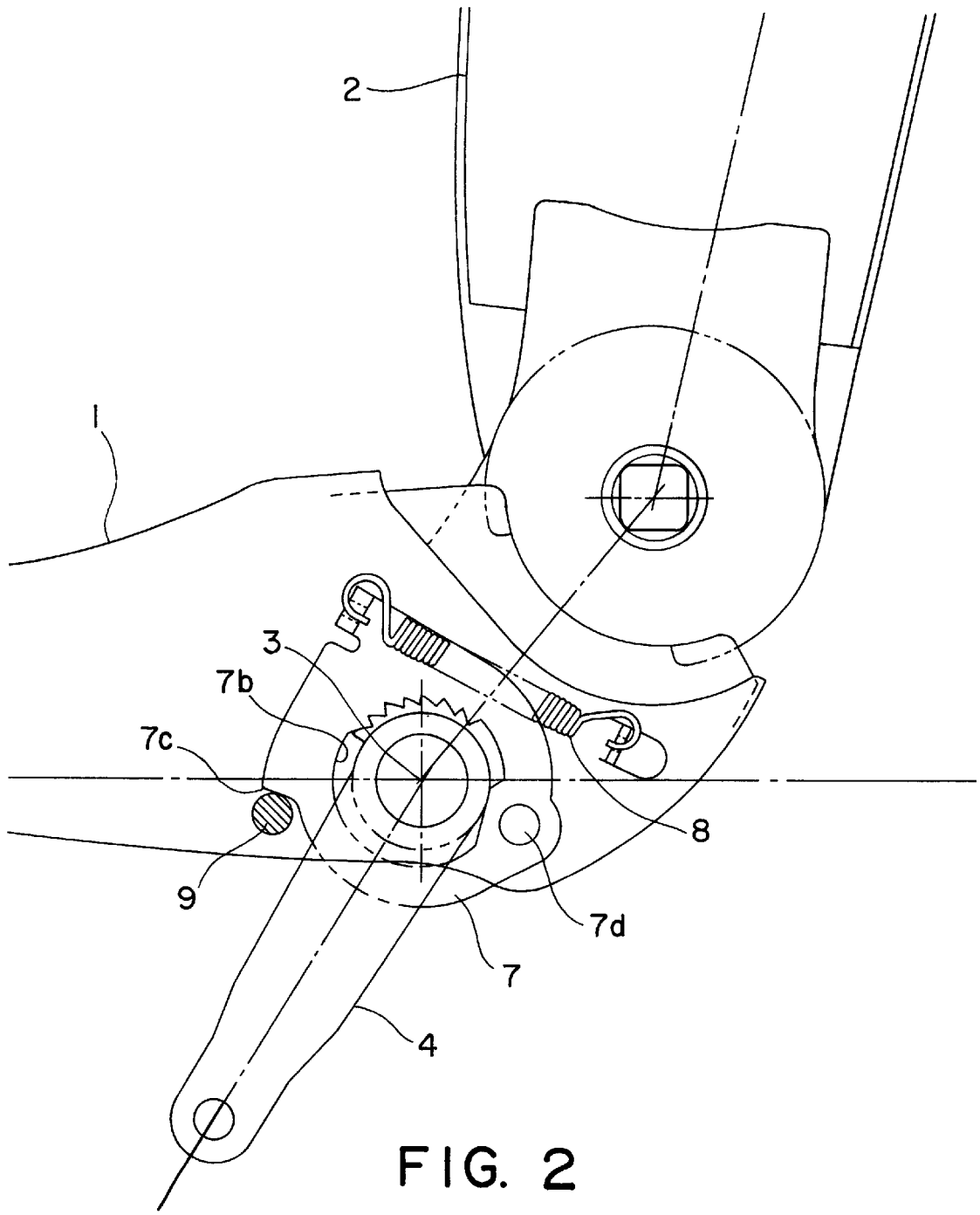
FIG. 2 shows the lateral view of the locking device according to FIG. 1, in the locked state.
Figure 3:
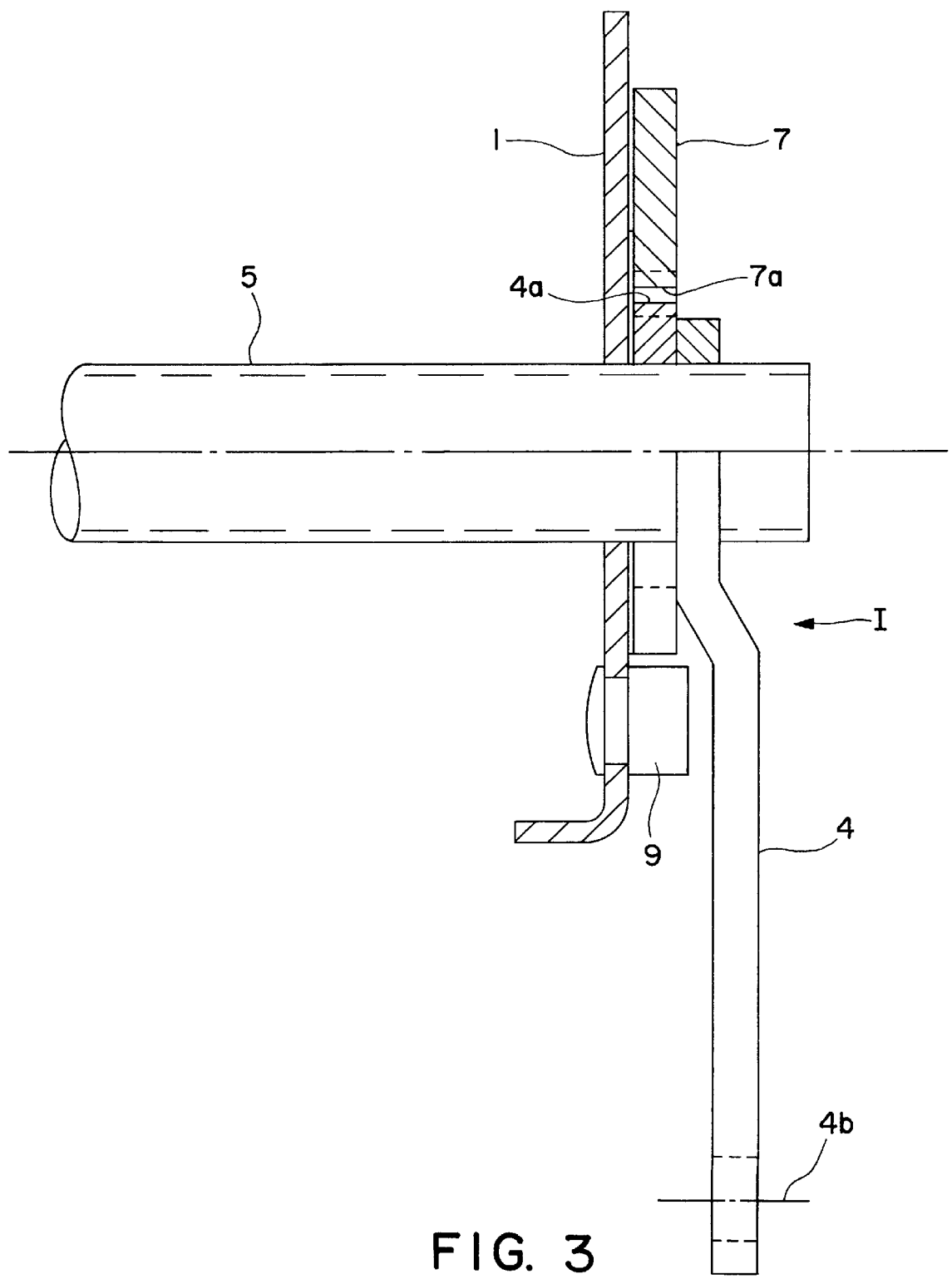
FIG. 3 shows an enlarged sectional representation according to sectional plane III—III in FIG. 1.

Due to the fact that the axle 7d is arranged eccentrically and beneath the geometrical center of gravity of the locking element 7, a pivoting motion of locking element 7 against the force of spring 8 always occurs when the inertial mass of locking element 7 exceeds the force of spring 8. The dentiform projections 7a then mesh, as FIG. 2 shows, with the dentiform projections 4a attached to the guide bar, so that a pivoting motion of guide bar 4 is prevented, regardless of the locking of the height adjustment device that is provided on the right side of the seat.

In order to assure that the dentiform projections 7a mesh securely with the dentiform projection 4a affixed to the guide bar when a prescribed force of acceleration is exceeded, the size of the teeth 4c and 7e and of the corresponding gaps between the teeth 4e and 7f increases in a clockwise direction. In the event of a crash, in addition, the tractive force of the seat belt, which is attached to the seat frame 1 presses the gear teeth 4a into the dentiform projections 7a due of the elastic deformation of the elements involved.

I claim:

1. A motor vehicle seat with a seat frame and a seat height adjustment device having two guide bars attached to a motor vehicle chassis;

said guide bars pivotable by pivoting means about a horizontal axis into various positions of inclination in order to adjust the height of the seat;

wherein:

said guide bars are connected so as to resist torsion; and
on the side of the seat opposite said pivoting means, a locking device which is sensitive to inertia is provided between the seat frame and an adjacent guide bar.

2. The motor vehicle seat of claim 1, said locking device comprising a pivotable locking element with dentiform projections having an unlocked position and a locked position, wherein:

in said unlocked position, a spring holds said locking element out of engagement with dentiform projections on said adjacent guide bar; and when a prescribed force of acceleration is exceeded, said locking element assumes said locked position by pivoting to make contact with a stop affixed to said seat frame, and the dentiform projections on the locking element engage the dentiform projections on the guide bar.

3. The motor vehicle seat of claim 2, wherein said dentiform projections on said locking element and said guide bar have a saw-tooth form.

4. The motor vehicle seat of claim 3, wherein said dentiform projections and the gaps between them increase in size in a direction opposite a direction of acceleration.

5. The motor vehicle seat of claim 2, wherein said locking element has the form of a disc, and at its center, has a recess in which said dentiform projections are arranged.

6. The motor vehicle seat of claim 5, said locking element further having a tappet on its outer circumference which makes contact with a contact bolt.

\* \* \* \* \*

UNITED STATES PATENT AND TRADEMARK OFFICE
CERTIFICATE OF CORRECTION

PATENT NO. : 6,250,705 B1
DATED : June 26, 2001
INVENTOR(S) : Harald Zuch

It is certified that error appears in the above-identified patent and that said Letters Patent is hereby corrected as shown below:

<u>Title page,</u>
Item [73], Assignee, should read: -- Faurecia Autositz GmbH & Co. KG -- not "Faurecia Autositze GmbH & Co. KG".

Signed and Sealed this

Twenty-sixth Day of November, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,250,705 B1
DATED : June 26, 2001
INVENTOR(S) : Harald Zuch

It is certified that error appears in the above-identified patent and that said Letters Patent is hereby corrected as shown below:

<u>Title page,</u>
Item [73], Assignee, should read -- Faurecia Autositz GmbH & Co. KG -- not "Faurecia Autositze GmbH & Co. KG".

This certificate supersedes Certificate of Correction issued November 26, 2002.

Signed and Sealed this

Twenty-ninth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,250,705 B1
DATED : June 26, 2001
INVENTOR(S) : Harald Zuch

It is certified that error appears in the above-identified patent and that said Letters Patent is hereby corrected as shown below:

<u>Title page,</u>
Item [73], Assignee, should read -- Faurecia Autositze GmbH & Co. KG --

This certificate supersedes Certificate of Correction issued July 29, 2003.

Signed and Sealed this

Twenty-sixth Day of August, 2003

JAMES E. ROGAN
*Director of the United States Patent and Trademark Office*